United States Patent [19]
Ishida et al.

[11] Patent Number: 6,084,557
[45] Date of Patent: Jul. 4, 2000

[54] SYSTEM FOR DISPLAYING COMBINED IMAGERY

[75] Inventors: Tokuji Ishida, Daito; Shigeaki Imai, Uji; Akira Sato, Shiga-Ken; Susumu Tachi, Tsukuba, all of Japan

[73] Assignee: Minolta Co., Ltd., Osaka, Japan

[21] Appl. No.: 09/082,042

[22] Filed: May 20, 1998

[51] Int. Cl.$^7$ .............................. G09G 5/00; H04N 7/00
[52] U.S. Cl. ................ 345/9; 345/7; 345/8; 348/36; 348/37
[58] Field of Search .................... 345/7–9, 13–16; 348/348, 207, 115–116, 36–39; 396/89

[56] References Cited

U.S. PATENT DOCUMENTS

| | | | |
|---|---|---|---|
| 4,614,974 | 9/1986 | Toyama | 358/227 |
| 5,644,324 | 7/1997 | Maguire, Jr. | 359/9 |
| 5,734,421 | 3/1998 | Maguire, Jr. | 348/115 |
| 5,815,411 | 9/1998 | Ellenby et al. | 345/9 |

OTHER PUBLICATIONS

Shinsuke Suzuki et al, "Design of Visual Display for Augmented Reality—Fusion of Real and Virtual Space Image Using Depth from Viewpoint–", Proceedings of the 35th SICE Annual Conference, Domestic Session Papers vol. I, 107 D–2, (Jul. 24–26, 1996) with an English translation thereof.

Matthias M. Wloka et al, "Resolving Occlusion in Augmented Reality", Proceedings of 1995 Symposium on Interactive 3D Graphics, pp. 5–12, (1995).

*Primary Examiner*—Richard A Hjerpe
*Assistant Examiner*—Duc Dinh
*Attorney, Agent, or Firm*—Sidley & Austin

[57] ABSTRACT

A video see through AR system capable of obtaining correct depth information with respect to each pixel representing a two-dimensional image is disclosed so that a portion of imagery which should appear in the background of a final picture may be properly hidden behind imagery which should appear in the foreground of the final picture. A photographing device is provided for obtaining a two-dimensional image of a real object field disposed in conjugate relationship with an observer's eyes. Also provided is a device for measuring distances with respect to each pixel to the real object to be measured. The measured distance is compared with the distance to virtual imagery with respect to each pixel and the pixel which represents the imagery disposed closer to the observer is selected for the formation of combined imagery, which is displayed on the screen of a display device.

9 Claims, 9 Drawing Sheets

SYSTEM FOR DISPLAYING COMBINED IMAGERY

BACKGROUND OF THE INVENTION

This application is based on Japanese Patent Application No. 9-133159 filed on May 23, 1997, the contents of which is incorporated herein by reference.

1. Field of the Invention

This invention relates to a system for displaying combined imagery, and more particularly to a system for displaying virtual imagery blended with real images with the aid of depth information in an augmented reality (AR) system.

2. Description of the Prior Art

A system for producing virtual reality (VR) has been devised, which is concerned with letting one feel as if computer-generated visuals were the real world. The VR system allows one to experience every detail of the realities of life in a virtual environment. The VR is also called artificial reality.

The aforesaid AR system is a kind of the VR system developed for enhancing the user's vision with computer-generated imagery.

Although the VR system allows a user to be completely immersed in the virtual environment, the AR system aims at improving the quality of a real environment by properly disposing the virtual environment therein. By the expression "AR system" as used herein is meant a visual AR system.

Various cases which are exemplary of the utility of the AR system can be enumerated. For example, an image obtained from a computerized tomographic scanner is overlaid on the real brain of a patient being operated by brain surgeons; the work of assembling or fixing up a machine is supported by notes appended to the real parts by computer graphics (CG); a person who is thinking of doing over his or her room is allowed beforehand to judge of the arrangement of new furniture by its effect upon his or her mind; or persons in charge of city redevelopment are allowed to have virtual sight of a full-sized row of stores and houses at the site of construction before they are actually built.

See-through head-mounted displays (STHMD's) to be used for the AR system are available in two types, optical and video. FIGS. 8 and 9 are diagrams for the principles of operation of the AR systems 80 and 90 provided with optical and video STHMD's respectively in accordance with the prior art.

The AR system 80 shown in FIG. 8 includes a half mirror 81 disposed on the visual axis of an observer so as to afford to him or her an overall view of the real object field. Virtual imagery are cast on the half mirror 81 by a projector 82 and reflected to the observer's eyes. Consequently, the real object field is seen through the virtual imagery. A head position detector 83 mounted on the observer's head transmits a signal to a workstation 84 when the former detects a change in the observer's visual point caused by his or her carriage of looking aside, upward or downward. Then the workstation 84 transmits a signal to the projector 82 so as to change virtual imagery in accordance with a change in the observer's visual point.

The AR system 90 shown in FIG. 9 includes two cameras 93 disposed in conjugate relationship with the observer's eyes respectively and adapted to photograph the real object field which would be seen to the observer if it were not for a double-faced mirror 91. A workstation 95 receives real images from the cameras 93 and combines them with virtual imagery. Combined imagery resulting therefrom are cast on the double-faced mirror 91 by the projector 82 and reflected to the observer's eyes.

It has been pointed out that the AR system requires complete registration between imagery which should appear in the foreground of a final picture and imagery which should appear in the background and that the portion of the latter on which the former is overlaid should be hidden behind the former. The second mentioned requirement is not fulfilled by either of the aforesaid AR systems 80 and 90.

More specifically stated, the AR system 80 is necessarily foredoomed to allowing the real object field to be seen through the virtual imagery. Thus the virtual imagery is merely superimposed over the real object field.

The AR system 90 is such that the virtual imagery always appear in the foreground of the final picture and, consequently, the portion of the real images on which the virtual imagery are overlaid is hidden and left invisible behind the virtual imagery. This is the case even when the real images have to appear in the foreground of the final picture.

The recent progress in the psychology of perception has revealed that improper or unexpected stereoscopic vision is caused by a wrong positional relationship between the real object field and virtual imagery, because such a wrong positional relationship is contradictory to the information on the actual vergence and parallax. This finding provides a conclusion that a correct positional relationship between the real object field and virtual imagery is of prime importance in the AR system.

A previously proposed apparatus of this type described in U.S. patent application Ser. No. 08/896,973 is based on the fact that, when an image which should appear in the foreground of a final picture is overlapped on an image which should appear in the background of the final picture, pixels representing one of the overlapped portions of these two images are located at the same locations as pixels representing the other thereof. The distance between the apparatus and one image is compared with the distance between the apparatus and the other image. The pixels which represent the image disposed closer to the observer are selected for the purpose of display.

Thus the above-described previously proposed apparatus requires depth information with respect to each pixel representing a real image. A method of obtaining this information has heretofore been proposed where two-dimensional images are obtained from two cameras, respectively, arranged along a line perpendicular to the optical axes of the cameras. By means of correlation analysis, a point which corresponds to a point on one of the two-dimensional images is found on the other thereof. The aforesaid information is obtained by applying a trigonometric relation to these two points.

The above-described method has the disadvantages that corresponding points cannot be detected from the flat portions of real images and that wrong points are mistaken for corresponding points in the presence of patterns similar to each other.

A light section method, in which an object is actively irradiated by light beams, may solve the aforesaid problems. In this case, however, a sensor for receiving the light beams reflected on the surface of the object has to be provided separately from the cameras, and this necessitates a means for allowing the visual point of the sensor to agree with that of the cameras. If the visual points do not agree with each other, a measured distance differing from the actual distance will hinder the aforesaid second mentioned requirement from being fulfilled.

SUMMARY OF THE INVENTION

The primary object of the invention is to provide a video see-through AR system capable of obtaining correct depth information with respect to each pixel representing a two-dimensional image so that a portion of imagery which should appear in the background of a final picture may be properly hidden behind imagery which should appear in the foreground of the final picture.

Another object of the invention is to provide an apparatus of the kind indicated above, which allows the visual point and visual field of a means for obtaining depth information and a two-dimensional image to agree with the visual point and visual field of an observer so that the combined imagery may not cause him or her to have a sense of incompatibility.

In accordance with the invention, photographing means for obtaining a two-dimensional image of a real object field are disposed in conjugate relationship with an observer's eyes respectively. Means for measuring distances permit the distance to the real object to be measured with respect to each pixel. The measured distance is compared with the distance to virtual imagery with respect to each pixel. The pixel which represents the imagery disposed closer to the observer is selected for the formation of combined imagery, which are displayed on the screen of a display means.

The means for measuring distances include light-emitting means adapted to emit a light pattern toward the real object and a sensor adapted to receive the light beams reflected on the surface of the real object. A nonlimiting example of the light pattern is a thin scanning curtain produced by a laser beam rapidly reciprocated in a vertical or horizontal direction. The light beams reflected on the surface of the real object are incident on a half mirror. Upon striking the half mirror, the light beams are divided thereby into two fractions according to, e.g., wave lengths so that one of the two fractions may be reflected on the surface of the half mirror while the other of the two fractions may be allowed to pass therethrough.

Preferably, the photographing means and the sensor are also disposed in conjugate relationship with an observer's eyes respectively. Preferably, the photographing means and the sensor subtend substantially the same field angle as that which is subtended by the observer's eyes.

DESCRIPTION OF THE PREFERRED EMBODIMENTS

Figure 1:
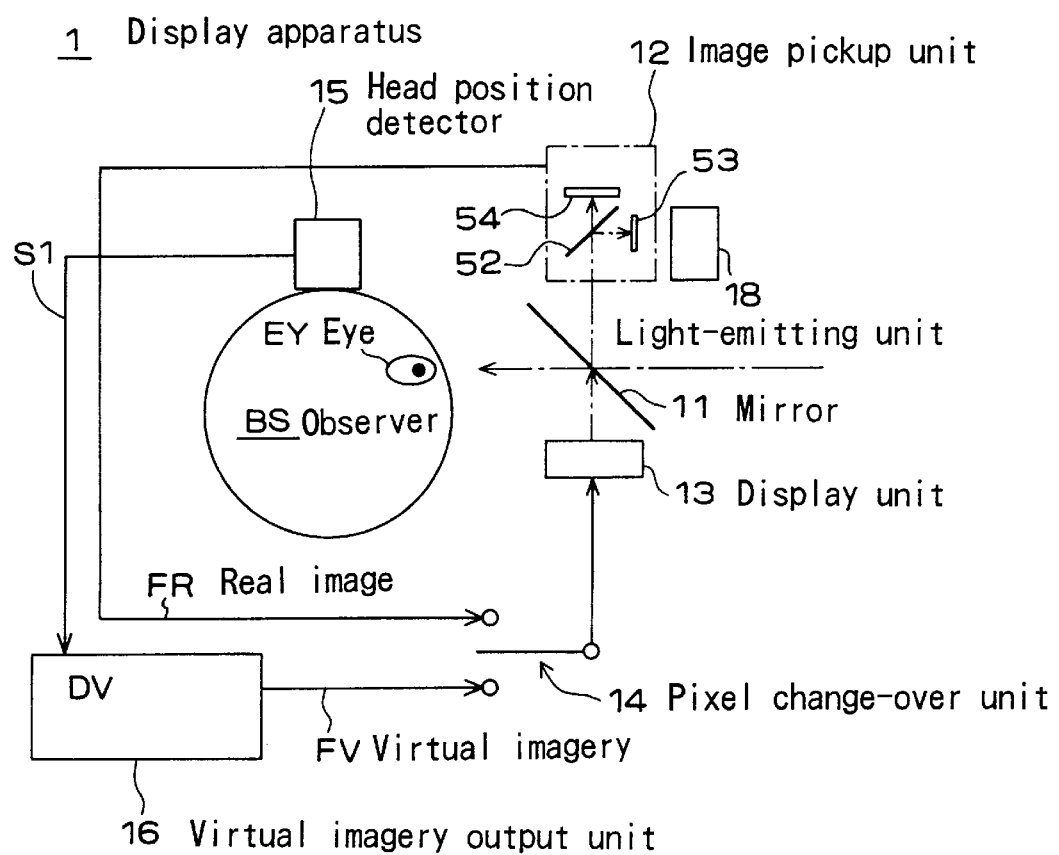
FIG. 1 is a diagrammatic view of the entire apparatus of this invention.

Referring now to FIG. 1, an apparatus 1 of this invention comprises mirrors 11, image pickup units 12, light-emitting units 18, display units 13, pixel change-over unit 14, head position detector 15 and virtual imagery output unit 16. The mirrors 11, image pickup units 12, light-emitting units 18 and display units 13 are respectively paired so as to be allotted to both eyes EY of an observer BS.

Each of the mirrors 11, having reflecting surfaces on both sides thereof, is disposed in front of the eye EY and makes an angle of about 45° with the visual axis of the eye EY.

Figure 2:
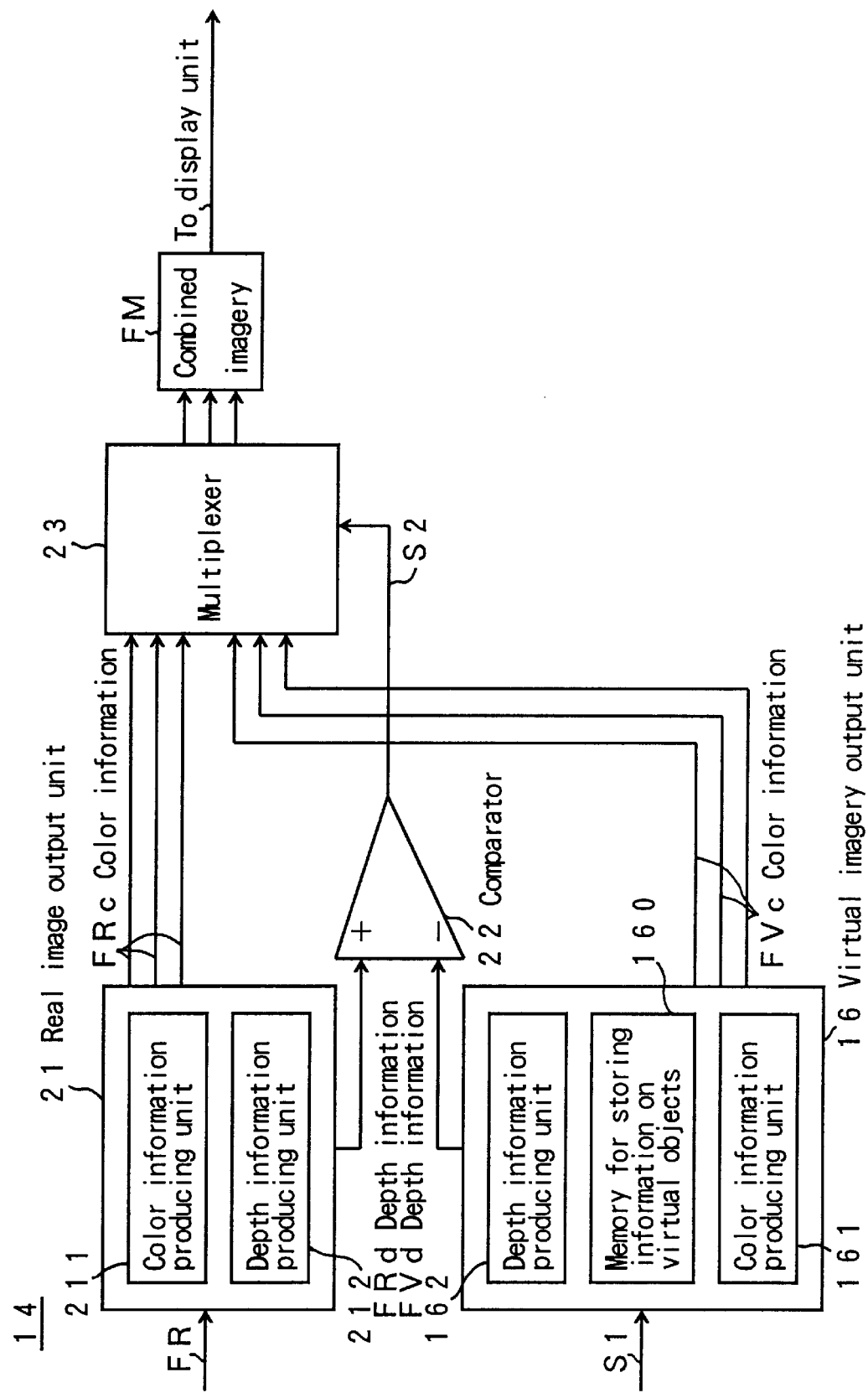
FIG. 2 is a block diagrammatic representation of change-over means for making a switchover of pixels representing an image which should appear in the foreground of a final picture.

Each of the image pickup units 12 includes a color sensor 54 disposed in conjugate relationship with the eye EY and adapted to photograph a real object field reflected in the mirror 11. The image pickup unit 12 further includes a measuring sensor 53 for receiving light beams emitted from the light-emitting unit 18 and reflected on the surface of the object and for producing depth information FRd (FIG. 2). Incident light from the object strikes the mirror 11 and is reflected to a dichroic mirror 52, by which the light beams are divided into two fractions to be directed towards the color sensor 54 and the measuring sensor 53 respectively as will appear hereinafter.

Combined imagery FM (FIG. 2) outputted from the pixel change-over unit 14 are displayed on the screens of the display units 13 and reflected in the mirrors 11 so as to be seen by the observer BS. Incident light from the object strikes the mirror 11 coaxially of the same visual axis of the eye EY as that on which the combined imagery FM reflected in the mirror 11 substantially lie. A liquid crystal display or a cathode ray tube may be suitable for use as the display unit 13. As occasion demands, various types of lenses or mirrors may be associated with the display units 13.

As will appear hereinafter, the pixel change-over unit 14 makes a switchover from a real image FR to virtual imagery FV and vice versa for each pixel in accordance with the distance to an image which should appear in the fore- or background of a final picture.

The head position detector 15 detects the position and posture of the observer BS. The method of detecting his or her visual point on the basis of a signal S1 outputted from the head position detector 15 needs no further description since it forms no part of the present invention.

On the basis of the signal S1 and prestored information DV on virtual objects, the virtual imagery output unit 16 outputs virtual imagery FV and a depth information FVd (FIG. 2) that is a gathering of a distance information with regard to each imagery of each pixel represented by virtual imagery FV. A program for producing data on images obtained from actual photographing or prepared by CG, as well as such data per se, may be suitable for use as the information DV on virtual objects.

The pixel change-over unit 14 and the virtual imagery output unit 16 may take the form of hardware. Alternatively, they may take the form of a workstation or a personal computer. Hardware may be used together with a workstation or a personal computer. A program to be executed in the workstation or the personal computer may be stored in a RAM, ROM or hard disk or read out of a recording medium such as a CD-ROM, magneto-optic disk or floppy disk or sent from a host computer through a telecommunication line. Various types of programs are available so as to be executed under various operating systems or system environments.

An important feature of this invention is that, as will appear hereinafter, the distance to the real image FR from the visual points of the image pickup units 12 disposed in conjugate relationship with the eyes EY of the observer BS is calculated and, in order to produce combined imagery FM, a switchover from the real image FR to virtual imagery FV and vice versa is made for each pixel in accordance with the calculated distance.

In a known method of CG, it is most common to use z-buffering for occluding a portion of more distant objects to be hidden behind less distant objects. The concept of z-key introduced by Takeo Kanade et al. involves a process similar to z-buffering in the achievement of a proper positional relationship between the real object field and virtual imagery in the AR system. The crux of this concept is that z-values in a coordinate system for a camera should be used as criterions for the aforesaid switchover. The pixel change-over unit 14 has resulted from advancing this concept a step forward.

Referring now to FIG. 2, the pixel change-over unit 14 comprises a real image output unit 21, comparator 22 and multiplexer 23.

The real image output unit 21 comprises a color information producing unit 211 and a depth information producing unit 212. The color information producing unit 211 produces color information FRc on the basis of the real image FR photographed by the color sensor 54. On the basis of information outputted from the measuring sensor 53, the depth information producing unit 212 produces depth information FRd that is a gathering of a distance information with regard to each point on the surface of an object represented by the real image FR. As this specification proceeds, there are some cases where the expression "color information FRc" is used as a synonym for the real image FR.

The virtual imagery output unit 16 comprises a memory 160, color information producing unit 161 and depth information producing unit 162. The information DV on virtual objects is stored in the memory 160. The color information producing unit 161 produces color information FVc on the basis of the signal S1 and the information DV. Likewise on the basis of the signal S1 and the information DV, the depth information producing unit 162 produces depth information FVd that is a gathering of a distance information with regard to each imagery of each pixel represented by the color information FVc. As this specification proceeds, there are some cases where the expression "color information FVc" is used as a synonym for the virtual imagery FV.

With respect to each pixel, the depth information FRd and the depth information FVd are compared with each other in the comparator 22, which outputs a signal S2 indicating the result of comparison.

The function performed by the multiplexer 23 is to select data on images to be disposed closer to the observer's visual point. The choice, which lies between the real image FR and the virtual imagery FV, is made on the basis of the signal S2 received from the comparator 22. The combined imagery FM outputted from the multiplexer 23 are an aggregate of data on the real image FR and the virtual imagery FV disposed closer to the observer's visual point.

The real image FR and the virtual imagery FV represented by the color information FRc, FVc and the depth information FRd, FVd obviate the necessity of inferring the stereoscopic structure of the real object at the time of blending the virtual imagery FV with the real images FR. Consequently, the electrical circuit required for the blending is allowed to be of simple design as shown in FIG. 2. This is a distinct advantage in view of the fact that the AR system requires data to be processed at real-time rates.

In order to apply the aforesaid z-key to the AR system, it is necessary to measure distances at real-time rates. Specific reference is now made to a process involved in such measurement.

Figure 3:
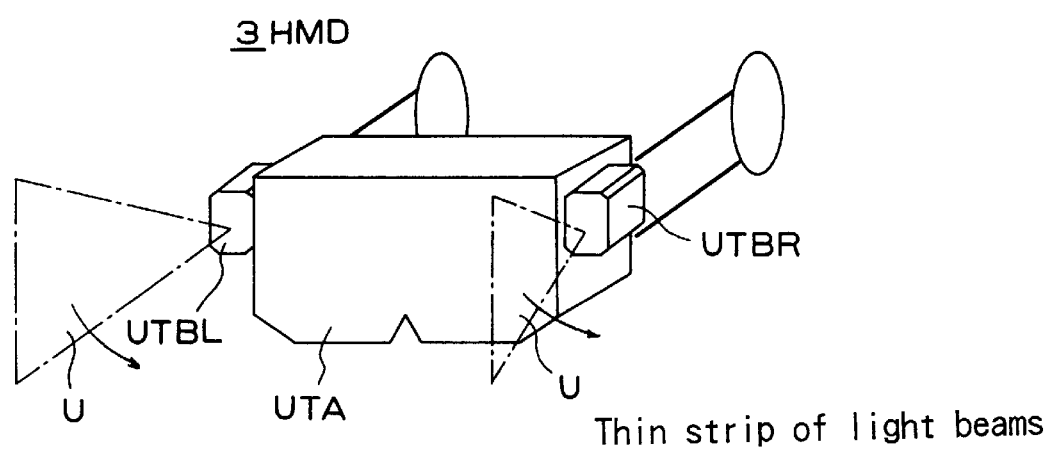
FIG. 3 is a perspective view of an illustrative example of an HMD suitable for use in the apparatus of this invention.

Referring now to FIG. 3, an HMD 3 which may be used in the apparatus 1 of this invention comprises a display and image pickup unit UTA for taking in scenery and depth information and light emitters UTBL and UTBR allotted to left and right eyes respectively and adapted to emit light patterns U for measuring distances.

In order to allow the distances to be measured with long base length, the light emitters UTBR and UTBL are mounted on the left- and right-hand ends respectively of the display and image pickup unit UTA, on the upper surface of which the head position detector 15 (FIG. 1) may be mounted.

Figure 4:
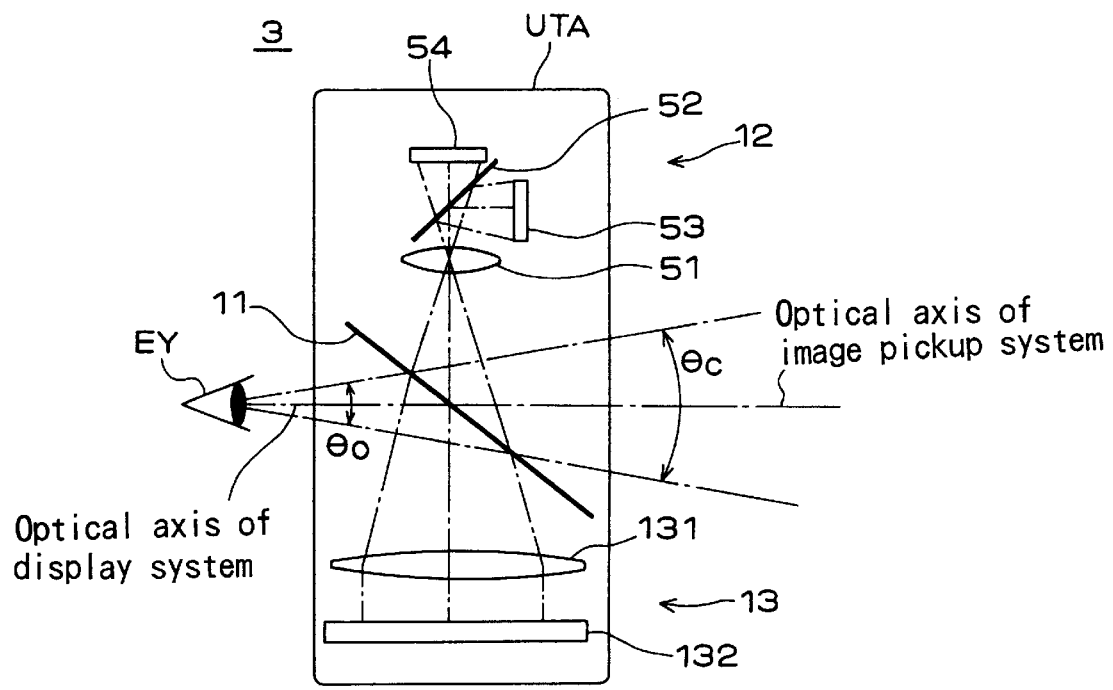
FIG. 4 is a view showing the component parts of a display and image pickup unit.

The image pickup units 12 and the display units 13 shown in FIG. 1 are accommodated in the display and image pickup unit UTA. As aforesaid, they are respectively paired so as to be allotted to both eyes EY of the observer BS. In FIG. 4, however, only that section of the display and image pickup unit UTA pertaining to one eye EY has been shown.

The image pickup unit 12 comprises an objective lens (or an objective lens assembly) 51, dichroic mirror 52, measuring sensor 53 and color sensor 54. Incident light from an object strikes the mirror 11 and is reflected to the objective lens 51, by which the light beams are converged and allowed to pass through the dichroic mirror 52 and form an image on the color sensor 54. The light pattern U emitted from the light emitter UTBL or UTBR reaches the object and is reflected back to the mirror 11, on which it is reflected to the objective lens 51, by which the light beams are converged, reflected on the surface of the dichroic mirror 52, and allowed to form an image on the measuring sensor 53.

The display unit 13 comprises an eyepiece assembly 131 and a display device 132. An image is displayed on the screen of the display device 132 so as to be viewed by the observer BS through the eyepiece assembly 131 and the mirror 11. A virtual sight distance can be selected from a range between one meter and infinity.

The optical axis of the image pickup system is defined as an axis on which the central point C (FIG. 5) of the color sensor 54 and the principal point O of the objective lens 51 lie. The optical axis of the display system is defined as an axis on which the central point of the display device 132 and the principal point of the eyepiece assembly 131 lie.

The optical axis of the image pickup system is disposed such that, when a light beam incident on the obverse side of the mirror 11 collinearly with the visual axis of the eye EY is reflected on the mirror 11, the reflected light beam becomes collinear with the optical axis of the image pickup system. The optical axis of the display system is disposed substantially collinearly with the optical axis of the image pickup system. Consequently, when a light beam incident on the reverse side of the mirror 11 collinearly with the optical axis of the display system is reflected on the mirror 11, the reflected light beam becomes collinear with the visual axis of the eye EY. The distance between the central point of the measuring sensor 53 and a point at which the dichroic mirror 52 intersects the optical axis of the image pickup system is made equal to the distance between the central point C of the color sensor 54 and the aforesaid point of intersection. By virtue of this positional relationship between the measuring sensor 53 and the color sensor 54, the real image FR obtained from the latter can be correctly correlated with the depth information FRd obtained from the former.

Figure 5:
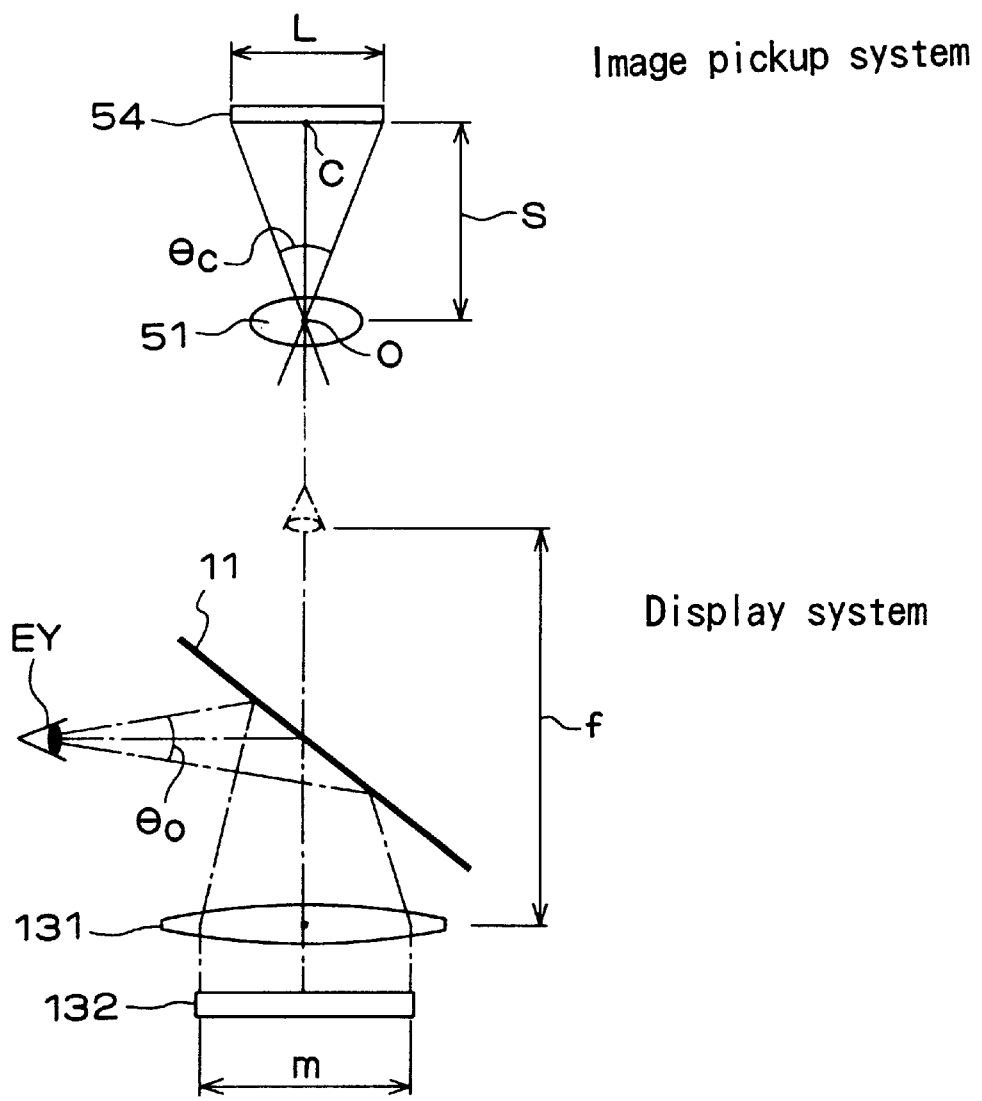
FIG. 5 is a view useful in understanding the field angles subtended by the image pickup system and the display unit respectively.

Referring now to FIG. 5, the image pickup unit 12 is allowed to subtend substantially the same field angle θc as the field angle θo subtended by the observer's eye EY if the following equation is satisfied:

$$L/S = m/f$$

where

L=size of the color sensor 54 in a direction perpendicular to the optical axis of the image pickup system S=distance between the central point C and the principal point O m=size of the display device 132 in a direction perpendicular to the optical axis of the display system f=focal length of the eyepiece assembly 131

The observer BS is free from a sense of incompatibility in viewing the real object field if the parts occupy the positions which satisfy the above equation and if the eye EY of the observer BS is disposed in conjugate relationship with the focal point of the eyepiece assembly 131 so as to make the light beams emitted from the display device 132 telecentric, i.e., so that a bundle of rays entering the eyepiece assembly 131 from the display device 132 in a direction parallel to the lens axis may, after refraction by the eyepiece assembly 131, converge to the eye EY.

Figure 6:
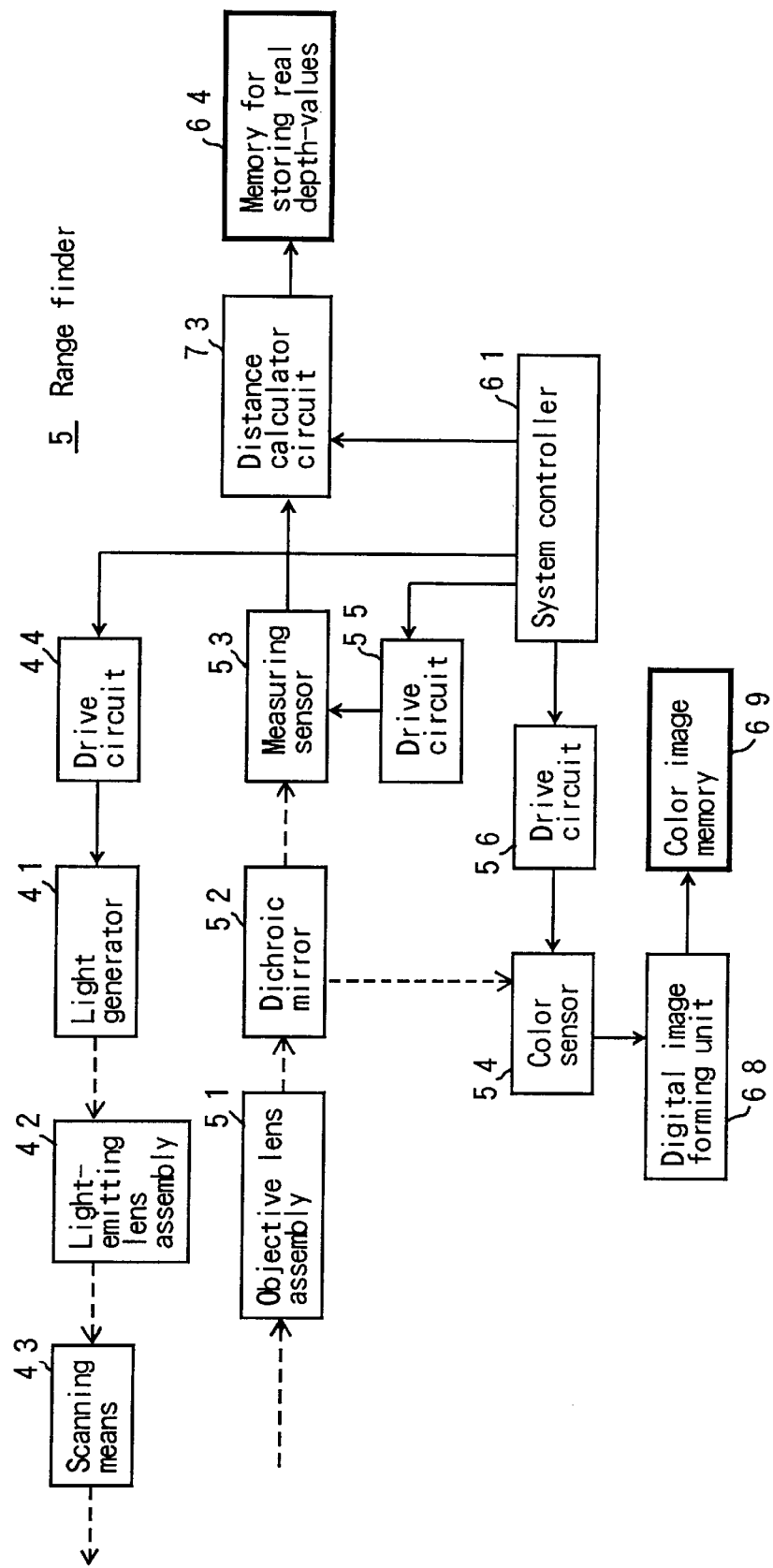
FIG. 6 is a block diagrammatic representation of a range finder.

Referring again to that section of the display and image pickup unit UTA pertaining to one eye EY, this section further includes a range finder 5, a block diagrammatic representation of which is shown in FIG. 6, in which electric signals are transmitted over communication buses illustrated in solid lines in the directions as indicated by arrows, while the light path with directions likewise indicated by arrows is illustrated in dashed lines.

The aforesaid image pickup unit 12, light-emitting unit 18 and real image output unit 21 form parts of the range finder 5. The light-emitting unit 18 includes a light generator 41, which may take the form of, e.g., a semiconductor laser. Laser beams falling within the infrared region are emitted from the light generator 41. These laser beams are formed into a thin strip U when they have been allowed to travel through a light-emitting lens assembly 42. The thin strip U of laser beams is pivoted by a scanning means 43, which preferably takes the form of a galvanometer mirror. A drive circuit 44 capable to drive the light generator 41 and driving systems (not shown) for the light-emitting lens assembly 42 and the scanning means 43 respectively are controlled by a system controller 61.

The objective lens assembly 51 included in the image pickup unit 12 may take the form of, e.g., a zoom unit, by which the laser beams reflected back thereto are converged. Then the laser beams are divided by the dichroic mirror 52 into two fractions. One of these two fractions consists of the laser beams emitted from the light generator 41 and falling within the infrared region. This fraction is directed towards a measuring sensor 53. The other of the two fractions, which falls within the visible spectrum, is directed towards a monitoring color sensor 54. Both of these sensors are CCD area sensors.

Every time a drive circuit 55 generates a clock pulse, image information supplied by the measuring sensor 53 is stored in a memory and fed to a distance calculator circuit 73. Every time a drive circuit 56 generates a clock pulse, image information supplied by the color sensor 54 is transmitted to a color processing circuit and stored in a color image memory 69 after quantization in a digital image forming unit 68. Depth- or z-values FRd calculated in the distance calculator circuit 73 on the basis of the image information supplied by the measuring sensor 53 are transmitted to a memory 64 for storing the depth information FRd.

Figure 7:
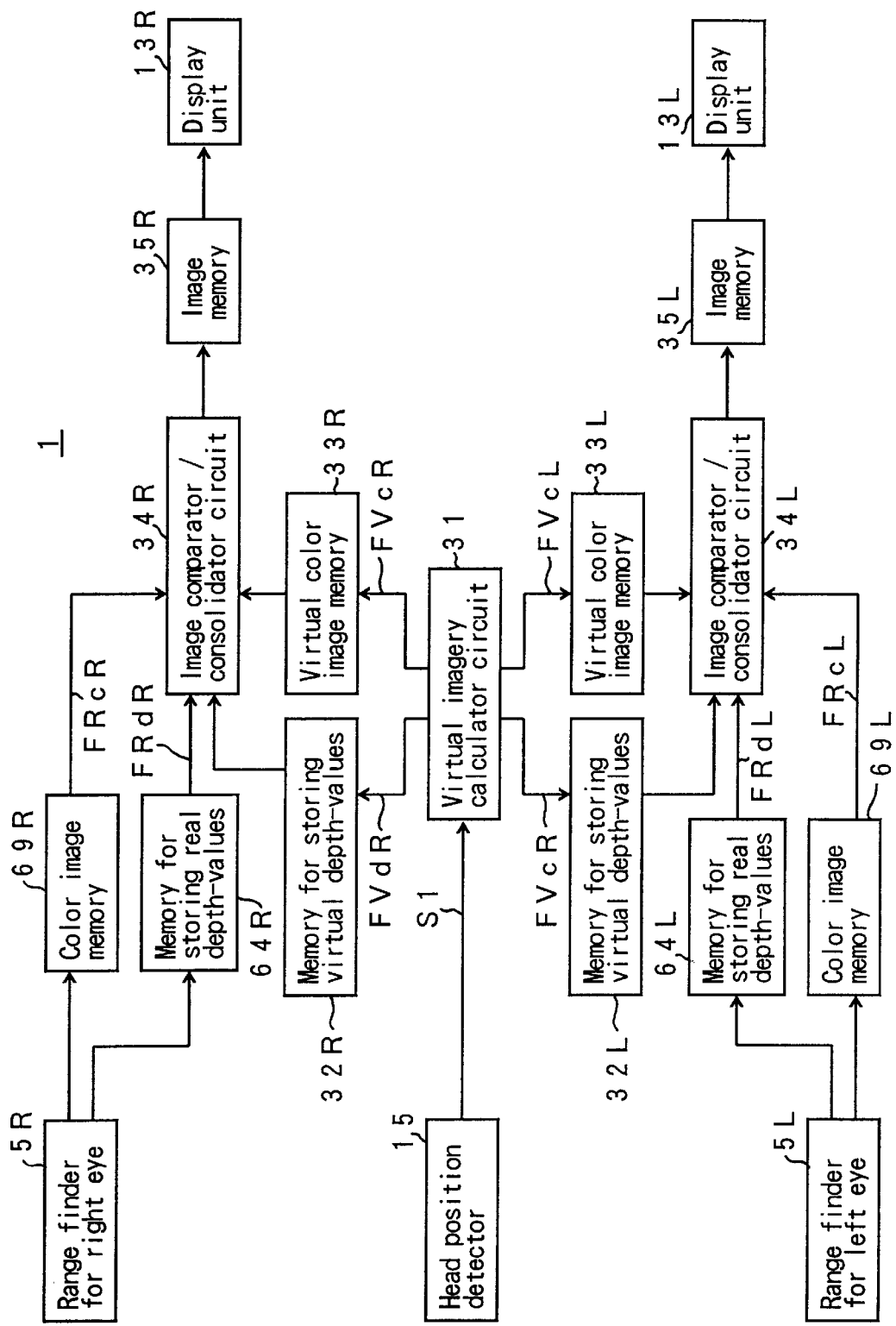
FIG. 7 is a block diagrammatic representation of an electrical circuit for the display unit.
Figure 8:
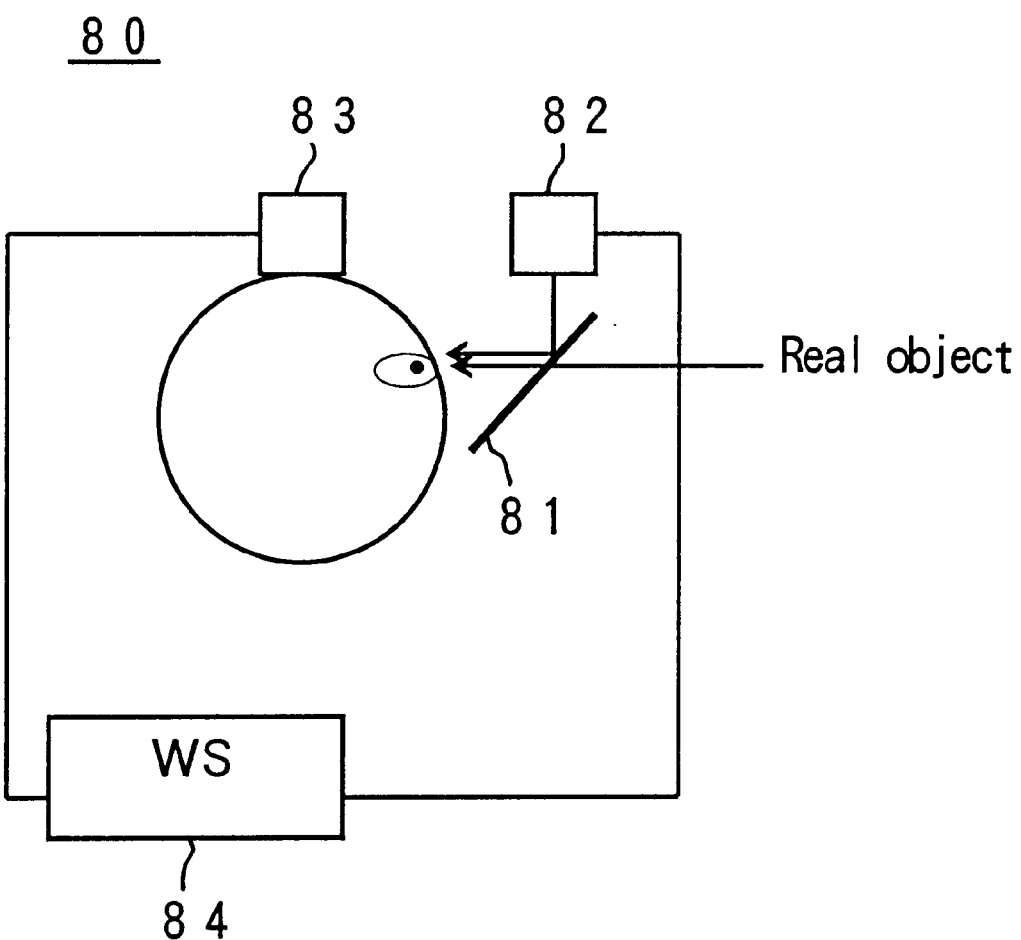
FIGS. 8 and 9 are diagrams for the principles of operation of the AR systems provided with optical and video STH-MD's respectively in accordance with the prior art.
Figure 9:
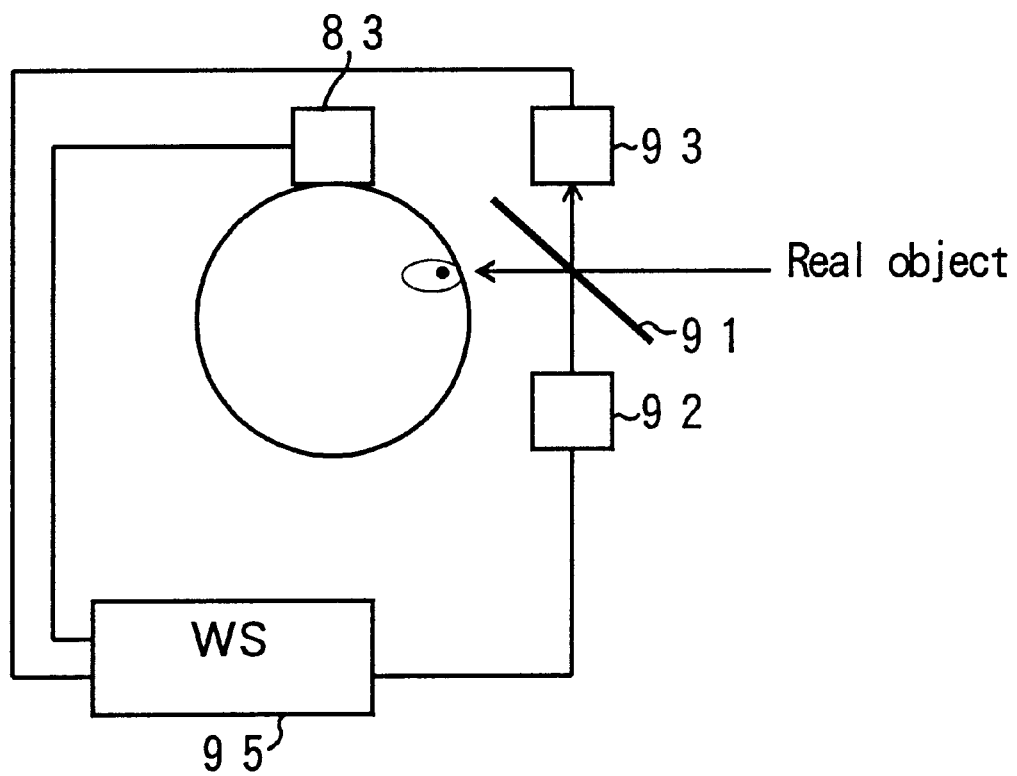

In FIG. 7 in which a general review of the apparatus 1 is made, the allotment of parts to the left and right eyes EY of the observer BS is designated by the letters L and R, respectively, appended to the reference numerals representing these parts.

The apparatus 1 comprises range finders 5L, 5R, memories 64L, 64R for storing the depth information FRd, color image memories 69L, 69R, head position detector 15, virtual imagery calculator circuit 31, memories 32L, 32R for storing virtual depth information, virtual color image memories 33L, 33R, image comparator and consolidator circuits 34L, 34R, image memories 35L, 35R and display units 13L, 13R.

Each of the range finders 5L and 5R is similar to that already described with reference to FIG. 6. The virtual imagery calculator circuit 31 produces depth information FVdL and FVdR, and color information FVcL and FVcR. These information are produced on the basis of a signal S1 outputted from the head position detector 15 and on the basis of a known positional relationship between the measuring sensor 53 and the virtual imagery calculator circuit 31. Depth information FVdL and FVdR are stored in the memories 32L and 32R respectively. The color information FVcL and FVcR are stored in the virtual color image memories 33L and 33R respectively.

In the image comparator and consolidator circuits 34L and 34R, depth information FRdL and FRdR for each pixel in the real image is compared with depth information FVdL and FVdR, respectively. The pixel which represents the image disposed closer to the observer BS is selected for the purpose of display. Combined imagery FM thus produced are stored in the image memories 35L, 35R and displayed on the screens of the display units 13L, 13R.

Referring now to the relationship between FIG. 2 and FIG. 7, the virtual imagery output unit 16 shown in FIG. 2 consists of the virtual imagery calculator circuit 31, memories 32L, 32R for storing virtual depth-values and virtual color image memories 33L, 33R shown in FIG. 7, while the comparator 22 and the multiplexer 23 shown in FIG. 2 correspond to the image comparator and consolidator circuits 34L, 34R shown in FIG. 7.

In the claims which follow, the color sensor 54 will be referred to as a "photographing device"; the range finder 5 as a "distance measuring device"; the virtual imagery output unit 16 as an "information output device"; the multiplexer 23 as a "selector"; the measuring sensor 53 as a "sensor"; and the dichroic mirror 52 as a "half mirror".

Changes in the construction, shape and arrangement of the several parts, as well as the data processing system design, may be made without departing from the nature and principle of the invention.

What is claimed is:

1. A system for displaying combined imagery, comprising:

at least one photographing device for obtaining a first two-dimensional image of an object;

at least one distance measuring device for measuring a first distance information with regard to each point on a surface of said object represented by said first two-dimensional image;

an information output device for outputting a second two-dimensional image and a second distance information with regard to each imagery of each pixel represented by said second two-dimensional image; and means for comparing said first distance information with said second distance information with respect to each pixel, selecting image data which represent either one of said first two-dimensional image and said second two-dimensional image which is disposed closer for said each pixel, and displaying said image data;

wherein, said at least one distance measuring device comprises:
 a light-emitting unit for emitting a light pattern;
 a sensor for receiving said light pattern when it has been reflected on the surface of said object; and
 a half mirror disposed in a path of said light pattern incident on said photographing device and adapted to direct a fraction of said light pattern towards said sensor.

2. A system for displaying combined imagery, comprising:
 at least one photographing device for obtaining a first two-dimensional image of an object;
 at least one distance measuring device for measuring a first distance information with regard to each point on a surface of said object represented by said first two-dimensional image;
 an information output device operable, on the basis of an observer's visual point and prestored information on virtual objects, for outputting a second two-dimensional image and a second distance information with regard to imagery of each pixel represented by said second two-dimensional image;
 a comparator for comparing said first distance information with said second distance information with respect to each pixel;
 a selector operable, on the basis of an output of said comparator, for selecting image data which represent either one of said first two-dimensional image and said second two-dimensional image which is disposed closer for said each pixel; and
 at least one display unit for displaying said first two-dimensional image blended with said second two-dimensional image such that a portion of displayed images represents said either one alone;

wherein, said at least one distance measuring device comprises:
 a light-emitting unit for emitting a light pattern;
 a sensor for receiving said light pattern when it has been reflected on the surface of said object; and
 a half mirror disposed in a path of said light pattern incident on said photographing device and adapted to direct a fraction of said light pattern towards said sensor.

3. A system as defined in claim 2, wherein said at least one photographing device and said sensor included in said at least one distance measuring device are disposed in conjugate relationship with at least one of said observer's eyes.

4. A system as defined in claim 3, wherein:
 said at least one photographing device and said at least one display unit are respectively paired so as to be allotted to both eyes of said observer and collectively constitute a display and image pickup unit; and
 said at least one distance measuring device also being paired so as to be allotted to both eyes respectively of said observer.

5. A system as defined in claim 4, wherein, in order to allow the distances to be measured with long base length, said distance measuring device allotted to right eye of said observer is mounted on the left-hand end of said display and image pickup unit, and said distance measuring device allotted to left eye of said observer is mounted on the right-hand end of said display and image pickup unit.

6. A system as defined in claim 5, wherein said at least one photographing device and said sensor included in said at least one distance measuring device subtend substantially the same field angle as that which is subtended by said observer's eyes.

7. A system as defined in claim 5, wherein a thin strip of light beams falling within an infrared region is used as said light pattern.

8. A system as defined in claim 5, wherein said half mirror is such that, upon striking the same, incident light is divided thereby into two fractions according to wave lengths.

9. A system as defined in claim 5, wherein said half mirror reflects light beams falling within the infrared region.

* * * * *

UNITED STATES PATENT AND TRADEMARK OFFICE
CERTIFICATE OF CORRECTION

PATENT NO. : 6,084,557
DATED : July 4, 2000
INVENTOR(S) : Tokuji Ishida et al.

It is certified that error appears in the above-identified patent and that said Letters Patent is hereby corrected as shown below:

Title Page,

Item [73]
Assignee:, after "Minolta Co., Ltd., Osaka, Japan", insert --, and Susumu Tachi, Tsukuba, Japan --.

Item [75]
Inventors:, the second line, after "Sato,", delete "Shiga-Ken",
and insert -- Kurita-Gun --.
Inventors:, the third line, after "Tachi,", delete "Tsukuba",
and insert -- 2-31-14, Tsukuba-shi --.

After "Filed: May 20, 1998", insert -- [30] Foreign Application Priority Data May 27, 1997 [JP] Japan 9-133159 --.

Column 9,
Line 3. Delete the first instance of "each".

Signed and Sealed this

Seventh Day of August, 2001

Attest:

NICHOLAS P. GODICI
*Attesting Officer*     *Acting Director of the United States Patent and Trademark Office*